United States Patent
Groves et al.

(10) Patent No.: US 9,470,817 B2
(45) Date of Patent: Oct. 18, 2016

(54) METHOD AND APPARATUS TO DETERMINE PRESSURE IN A NEUTRON RADIATION GENERATOR

(71) Applicant: Schlumberger Technology Corporation, Sugar Land, TX (US)

(72) Inventors: Joel L. Groves, Leonia, NJ (US); Peter Wraight, Skillman, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 14/543,791

(22) Filed: Nov. 17, 2014

(65) Prior Publication Data

US 2016/0139294 A1    May 19, 2016

(51) Int. Cl.
G01V 5/10 (2006.01)
G01V 5/04 (2006.01)
H05H 3/06 (2006.01)

(52) U.S. Cl.
CPC . *G01V 5/04* (2013.01); *H05H 3/06* (2013.01)

(58) Field of Classification Search
CPC ......... H01J 27/205; H01J 37/08; G01V 5/10
See application file for complete search history.

(56) References Cited

U.S. PATENT DOCUMENTS

| 5,293,410 | A | 3/1994 | Chen et al. | |
|---|---|---|---|---|
| 7,978,804 | B2 | 7/2011 | Groves et al. | |
| 8,971,473 | B2* | 3/2015 | Leung | H05H 3/06 376/108 |
| 2010/0282978 | A1* | 11/2010 | Norling | H05H 13/00 250/396 ML |
| 2011/0114830 | A1 | 5/2011 | Reijonen et al. | |
| 2011/0226422 | A1* | 9/2011 | Kwan | H01J 27/16 156/345.48 |
| 2014/0183349 | A1* | 7/2014 | Flores | H01J 27/205 250/256 |
| 2014/0263993 | A1* | 9/2014 | Perkins | G21G 4/02 250/253 |

* cited by examiner

*Primary Examiner* — David Porta
*Assistant Examiner* — Faye Boosalis
(74) *Attorney, Agent, or Firm* — David G. Matthews; Michael Dae

(57) ABSTRACT

Systems, methods, and apparatuses to determine an operation gas pressure in a neutron radiation generator are described. In certain aspects, a method to determine the operation gas pressure includes receiving an operation radiation signal from a radiation generated by electrons backstreaming in a radiation generator, and determining from the operation radiation signal an operation gas pressure in a chamber of the radiation generator. An operation radiation signal may be received from a radiation detector associated with a neutron radiation generator. A radiation detector may detect radiation produced by particles (e.g., electrons) striking a portion (e.g., a cathode) of the neutron radiation generator.

20 Claims, 7 Drawing Sheets

METHOD AND APPARATUS TO DETERMINE PRESSURE IN A NEUTRON RADIATION GENERATOR

BACKGROUND

The disclosure relates generally to a neutron radiation generator, and, more specifically, to determining internal pressure in a neutron radiation generator.

A neutron radiation generator, when operating, may include a gas inside a chamber thereof. An acceleration member, e.g., to generate an electric field within a neutron generator, may accelerate ions from an ion source into an ion beam. The ion beam may be transported toward a target at a speed sufficient such that neutron radiation is generated when the ions impact the target. Neutron radiation may be emitted into material, e.g., a formation, adjacent to the radiation generator. The neutron radiation may interact with atoms in the material, and those interactions can be detected and analyzed in order to determine information about the material.

SUMMARY

This summary is provided to introduce a selection of concepts that are further described below in the detailed description. This summary is not intended to identify key features of the claimed subject matter, nor is it intended to be used as an aid in limiting the scope of the claimed subject matter.

In one aspect, a neutron radiation generator includes an ion source, a target, and an acceleration member between the ion source and the target. The generator also includes a radiation detector to detect a radiation generated by backstreaming electrons that are stopped in the ion source or in the acceleration member.

Another aspect is directed to a method that includes receiving a radiation signal from a radiation generated by electrons backstreaming in a radiation generator, and determining from the radiation signal a gas pressure in a chamber of the radiation generator.

Another aspect is directed to a method that includes receiving an operation radiation signal from a radiation generated by electrons backstreaming in a radiation generator, an operation acceleration signal from an acceleration member of the radiation generator, and an operation extractor signal from an extractor electrode of the radiation generator. The method also includes determining an operation gas pressure in a chamber of the radiation generator from the operation radiation signal, the operation acceleration signal, and the operation extractor signal.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

In the following description, numerous specific details are set forth. However, it is understood that aspects of the disclosure may be practiced without these specific details. In other instances, well-known circuits, structures, and techniques have not been shown in detail in order not to obscure the understanding of this description.

References in the specification to "one aspect," "an aspect," "an example aspect," etc., indicate that the aspect described may include a particular feature, structure, or characteristic, but other aspects may not necessarily include the particular feature, structure, or characteristic. Such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

Figure 1:
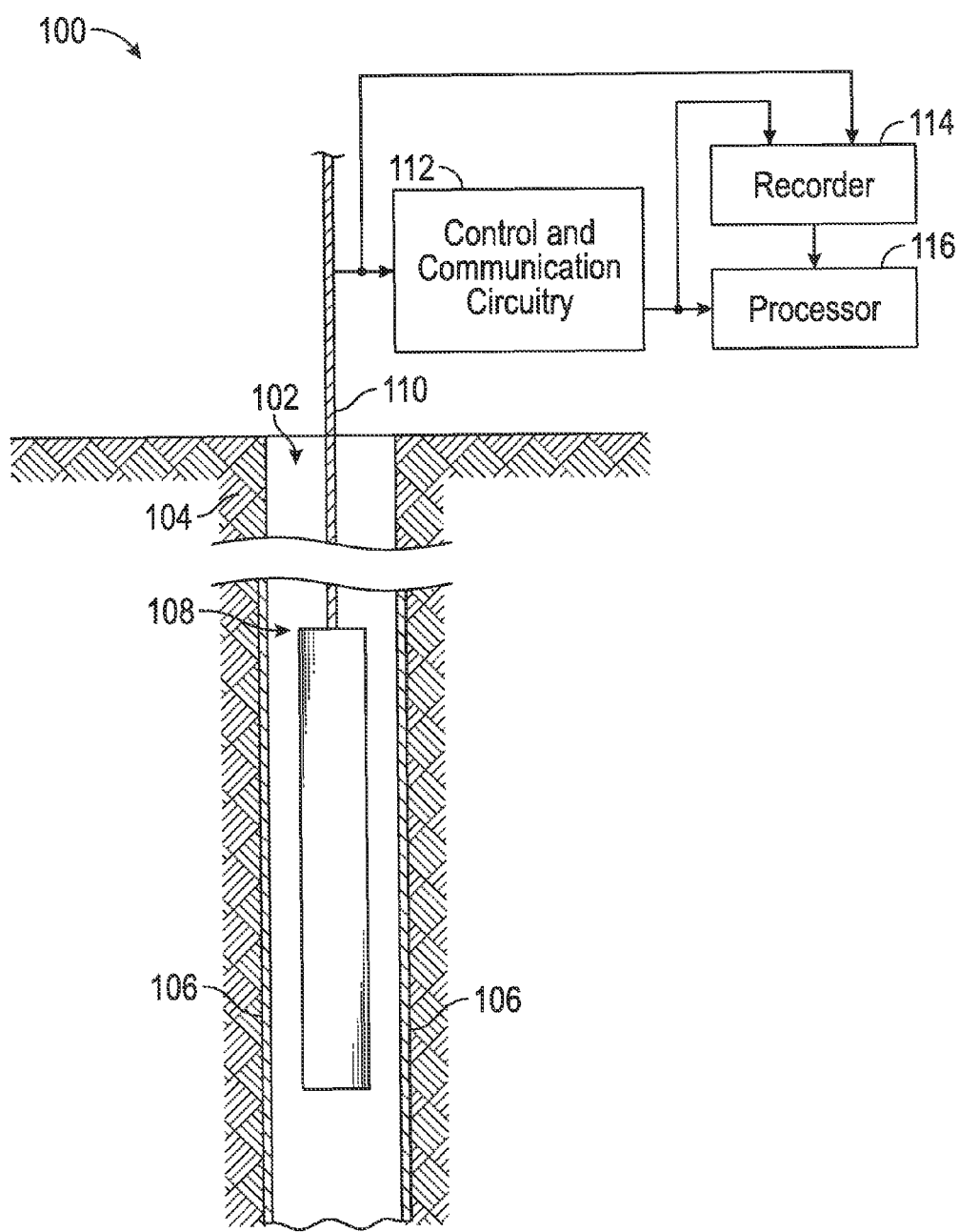
FIG. 1 illustrates a schematic of a well logging system.

Referring initially to FIG. 1, a schematic of a well logging system 100 is depicted. A (e.g., cylindrical) borehole 102 is drilled into a formation 104 with drilling equipment, and may use drilling fluid (e.g., referred to in oilfield verbiage as "mud") that results in a mudcake 106. A logging device (e.g., logging tool 108) is depicted as suspended below the surface of the formation 104 in the borehole 102 on a wireline (e.g., armored multiconductor cable) 110 to provide a wireline configuration, although logging while drilling (LWD) or measurement while drilling (MWD) configurations in-line with a drillstring (e.g., a rotating and reciprocating pipe) may also be used. The length of the wireline 110 may substantially determine the depth of the logging tool 108 within the borehole 102. A depth gauge may be provided to measure cable displacement over a sheave (e.g., a pulley), and thus provide the depth of logging tool 108 in the borehole 102. Control and communication circuitry 112 is shown at (e.g., above) the surface of the formation 104, although portions or the entirety thereof may be downhole. Optional recorder 114 is also illustratively included for recording well-logging data, as well as optional processor 116 for processing (e.g., filtering) the data. However, one or both of an optional recorder 114 and optional processor 116 may be remotely located (e.g., away from the well site).

Figure 2:
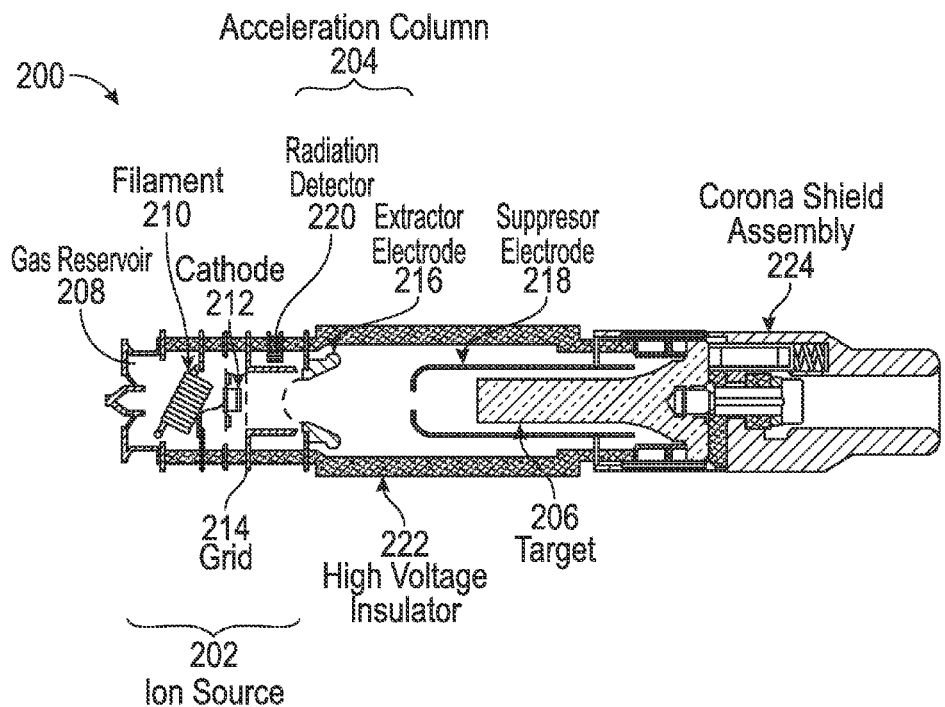
FIG. 2 illustrates an aspect of a neutron generator.

Logging tool 108 may include one or more types of logging devices that take measurements from which formation characteristics may be determined. For example, the logging device may be a nuclear logging device with includes a neutron or gamma ray generator and may include sensors to detect the interaction of radiation released into the formation 104, e.g., the interaction of neutrons or gamma rays with atoms in the formation 104. A logging tool 108 may include a neutron generator that is disclosed in either of U.S. Pat. Nos. 5,293,410 and 7,978,804, which are both hereby incorporated by reference in their entirety. In certain aspects of a neutron generator, it may be desirable to (e.g., continuously) determine an operation gas pressure within a neutron generator, for example, a chamber of the neutron generator. A radiation generator may be a neutron generator as depicted in FIG. 2. Radiation generator may be a linear particle accelerator or a cyclic particle accelerator (e.g., a betatron).

FIG. 2 illustrates an aspect of a radiation generator 200. Although FIG. 2 and FIG. 3 disclose two aspects of a neutron generator, one of skill in the art will understand that aspects of this disclosure may apply to any radiation generator. The depicted radiation generator 200 includes an ion source 202, an acceleration member (e.g., acceleration column 204), and a target 206.

Ion source 202 of depicted neutron generator 200 includes a filament 210 (e.g., helically wound filament) to supply a gas. In one aspect, the gas supplied is a hydrogen gas. A filament 210 may be formed of tungsten or another metal. A filament 210 may include a coating of a film of zirconium or the like for absorbing and/or emitting isotopes of hydrogen, e.g., deuterium, tritium, or a mixture thereof. A filament may be energized (e.g., heated to a predetermined or desired temperature) by power from a power supply (not shown). In an aspect, power is supplied (e.g., to a filament or any other component of a radiation generator) at a selected value, e.g., a selected current value or a selected voltage value. In one aspect, each end of filament is electrically connected to a power supply. Power supply may be controlled to provide a supply of a gas. The power supply (e.g., to a filament) may be controlled (e.g., by adjusting a current value supplied or a voltage value supplied) to regulate an operation gas pressure in a chamber, for example, to maintain a selected gas pressure during operation of a radiation generator. In one aspect, a selected gas pressure may be a range between about 1 milliTorr and about 10 milliTorr. In another aspect, a selected gas pressure may be a discrete value, for example, about 1 milliTorr or about 10 milliTorr. In one aspect, a selected gas pressure is two or more orders of magnitude below atmospheric pressure.

Depicted ion source 202 includes a cathode 212 (e.g., a thermionic cathode, field emitter array cathode, or spindt cathode), e.g., to release electrons when power is supplied thereto. Cathode may be a disk or toroid shape (e.g., with a longitudinal axis of the disk or toroid being coaxial with the longitudinal axis of the radiation generator). Depicted ion source 202 includes a grid 214 to produce a potential difference (e.g., relative to the cathode 212), for example, when voltage is supplied thereto. Grid may be a cylindrical, planar, hemispherical mesh (e.g., with the concavity facing the target) or screen.

In one aspect, an ion source includes a grid. For example, electrons emitted from the energized cathode 212 may attracted by the grid 214. The emitted electrons may collide with ionizable gas atoms to generate ions, e.g., deuterium ions, tritium ions, or a mixture thereof.

In one aspect, the generated ions have a net positive charge, i.e., a cation. The grid 214 may be disposed transversely to the longitudinal axis of the radiation generator 200, e.g., adjacent the cathode 212.

Depicted radiation generator 200 includes an acceleration member (e.g., acceleration column 204). Acceleration member 204 may include a one or more extractor electrodes to focus the generated ions (e.g., deuterium ions, tritium ions, or a mixture thereof) into an ion beam. An electrode may extend circumferentially around a longitudinal axis of the radiation generator. A plurality of electrodes may be used, e.g., in series along the longitudinal axis of the radiation generator. A voltage may be supplied to the one or more extractor electrodes to extract ions from the ion source and/or accelerate the ions towards a target. Acceleration member (e.g., acceleration column 204) may be disposed between an ion source 202 and a target 206. The acceleration current may be supplied by the high voltage power supply, e.g., $I_{HV}$. In one aspect, the $I_{HV}$ does not include current to the cathode. Power (e.g., an acceleration current and voltage) may be the power (e.g., current and voltage) supplied to a high voltage ladder to power an acceleration member. A power supply to power an acceleration member may be a separate power supply from a power supply to power a filament. Power (e.g., an acceleration current and voltage) may be the power (e.g., current and voltage) supplied to a Cockcroft-Walton ladder (e.g., multiplier circuit) to power an acceleration member. A signal may be received (e.g., provided to a receiver and/or processor) according to (e.g., a linear relationship with) power supplied to a component. Signal may be received (e.g., inputted into a system) via an electrical conductor and/or wireless transmission.

Accelerated ions may terminate at target 206 (e.g., target electrode). Target may be cylindrically shaped. Target 206 may include a coating of a film of titanium, scandium, or zirconium that form hydrides when hydrogen is present on a surface facing the ion beam. Target 206 may generate neutron radiation from the fusion reaction of a collision of hydrogen ions (e.g., deuterium or tritium ions or a mixture thereof) from the ion source 202 with hydrogen atoms (e.g., deuterium or tritium atoms or a mixture thereof) in the target 206.

Radiation generator 200 may also include a suppressor electrode 218 (e.g., suppressor). Depicted suppressor electrode 218 is a hollow tube with an opening extending toward the ion source. Suppressor (e.g., an end surface and/or an opening thereof extending toward the ion source) may be selected (e.g., shaped) such that an (e.g., substantially any) electron emitted from its surface will be intercepted (e.g., captured) by the extractor electrode 216. Suppressor electrode 218 may be connected to a power supply (e.g., a high voltage supply) and powered to restrict or prevent particles (e.g., electrons) from being extracted away from the target 206 upon ion bombardment. One of skill in the art may refer to these extracted electrons as "secondary electrons". In one aspect, the suppressor electrode 218 is at a lower potential with respect to the electric potential of the target. Although not depicted, one of ordinary skill in the art will understand that certain of the above components may be powered (e.g., supplied with a desired current and voltage).

An aspect of the disclosure may include receiving (e.g., sensing with a sensor and/or providing an output signal proportional to a sensed value of) at least one of the following: 1) a radiation signal from an x-ray radiation detector from radiation generated by electrons backstreaming in a radiation generator, 2) an operation grid signal from a grid of the radiation generator, 3) an operation extractor signal from an extractor electrode of the radiation generator, 4) a suppressor signal from a suppressor electrode, 5) a target signal of a target electrode, 6) a signal from a high voltage ("HV") power supply of the radiation generator, 7) an operation gas pressure in the chamber, or any combinations thereof. In one aspect, a sensor may passively sense a value without substantially affecting the value. In one aspect, the signal from a HV power supply is the HV power supply current, that is, the sum of the ion current and the electron backstreaming current.

An aspect may include receiving (e.g., from a processor regulating the supply at a desired level) at least one of 1) a grid current of a grid of the radiation generator, 2) an extractor current or voltage of an extractor electrode of the radiation generator, 3) a suppressor current or voltage of a suppressor electrode, 4) a target current of a target electrode 5) an ion current of an ion beam of the radiation generator, 6) a current or voltage of a power supply of the radiation generator, 7) an operation gas pressure in the chamber, or any combinations thereof.

A signal (e.g., a calibration signal) may be a set of signals to and/or from a respective component that corresponds to the same time and/or the same gas pressure in the radiation generator. For example, the signals (e.g., calibration current and/or voltage) received may be based on data that existed from one moment in time, e.g., at one gas pressure value in a radiation generator, such as a steady state operation of the radiation generator. A respective signal (e.g., an operation radiation signal and a calibration radiation signal) may be received from the same sensor or a functionally similar sensor, for example, a sensor that produces substantially the same signal (e.g., current and/or voltage) for the same level of matter (e.g., radiation) detected.

In one aspect, power (e.g., current and/or voltage) supplied to a filament is controlled (e.g., regulated) to achieve a selected gas pressure. In one aspect, the operation gas pressure in a chamber of a radiation generator is controlled to achieve a selected gas pressure by controlling the power (e.g., controlling either the current or voltage) supplied to a filament as well as the voltage applied to an extractor electrode to produce the desired neutron radiation output. A selected gas pressure may be a range of gas pressures, a minimum gas pressure, or a maximum gas pressure.

An operation gas pressure may be selected to produce a desired neutron radiation. In one aspect, power supplied to a filament 210 is (e.g., continuously) controlled (e.g., regulated) to achieve a desired neutron radiation output. For example, if a neutron radiation output should increase as a result of an increase in the power supplied to one aspect of a radiation generator, a corresponding decrease in power to the filament may reduce the operation gas pressure within the generator. This lower gas pressure may in effect decrease the number of ions available for acceleration, and thus restore the neutron radiation output to a desired value. Similarly, an increase in the power to a filament may increase the generator gas pressure, and thus increase the neutron radiation output. Although the chamber 208 is shown as extending substantially the entire length of the radiation generator, other shapes and/or sizes may be utilized. In one aspect, the chamber is a sealed envelope entirely within the radiation generator.

A radiation generator may include a sensor or sensors, e.g., within a chamber thereof. A sensor may output a signal based on a sensed physical quantity. A sensor may be disposed into a wellbore along with a radiation generator of a logging tool. The word "signal" generally refers to any information that may be transmitted and/or received. The word "sensor" generally refers to a device that responds to an input (e.g., an input quantity) by generating a functionally related output signal. A sensor may output an electrical signal (e.g., a current and/or a voltage), an optical signal, or any other signal. For example, a sensor may be included in a detector. Examples of a detector are a current detector such as an ammeter to measure a flow of electric charge and a voltage detector such as a voltmeter to measure an electrical potential difference (e.g., voltage) between two points in an electric circuit.

A detector may be a radiation detector. One example of a radiation detector produces an operation radiation signal (e.g., output) according to the (e.g., proportional to the total energy of radiation detected) flux, spatial distribution, spectrum, or other properties of radiation). In one aspect, an operation radiation signal is produced in response to detecting a photon emitted from a radiation source. A radiation detector may detect electromagnetic radiation (e.g., an X-ray or X-rays) and produce an output corresponding to a quantity of detected electromagnetic radiation. For example, receiving a first output signal (e.g., current and/or voltage) at one energy level of electromagnetic radiation compared to a second output signal (e.g., current and/or voltage) at a lower energy level of electromagnetic radiation. An X-ray radiation detector may produce an according (e.g., scaled) output signal when it detects X-rays in the energy range from 10 keV to 1000 keV. In one aspect, a radiation generator may include a ceramic tube that contains a deuterium and tritium mixture that undergoes fusion to produce (e.g., 14 MeV) neutrons. Backstreaming electrons may also be produced inside of the ceramic tube. A radiation detector may be disposed inside or outside of (e.g., adjacent to) the ceramic tube.

A radiation detector may detect radiation and output an according radiation signal. A radiation detector may detect ionizing radiation. A radiation detector may detect at least one of X-ray radiation and gamma radiation. X-ray radiation may refer to electromagnetic radiation (e.g., a photon) that is emitted by electrons outside the nucleus, while gamma radiation may refer to electromagnetic radiation (e.g., a photon) that is emitted by the nucleus. An operation radiation signal may indicate the detection of a gamma ray or X-ray photon and/or the quantity of detected gamma ray or X-ray photons. An X-ray may refer to electromagnetic radiation (e.g., a photon) having a wavelength in the range of 0.01 to 10 nanometers, corresponding to frequencies in the range 30 petahertz to 30 exahertz, and energies in the range 120 eV to 120 keV. One example of a radiation detector is a Silicon Carbide (SiC) radiation detector.

Figure 3:
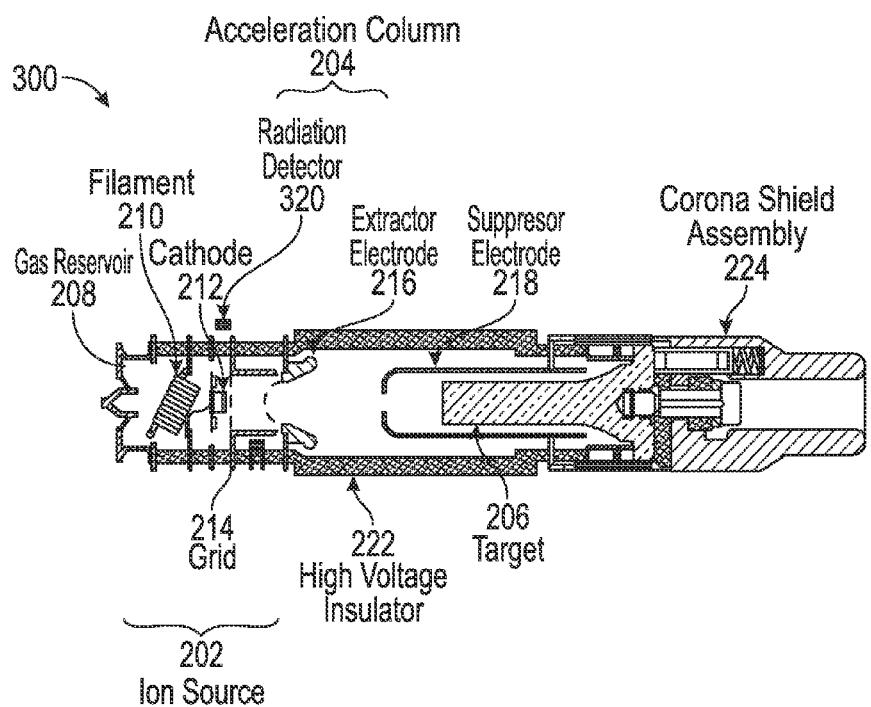
FIG. 3 illustrates an aspect of a neutron generator.

A radiation generator, such as the ones in FIGS. 2 and 3, may utilize ions striking a target to create neutrons (e.g., as discussed above). During the creation of neutrons, ions (e.g., hydrogen ions) may be transported through neutral hydrogen gas and produce electrons (e.g., via an ionization cross-section, as is known in the art). The phrase "ionization cross-section" generally refers to a measurement of the probability that a given ionization process will occur when a photon, electron, atom, or molecule interacts with a unionized atom, or molecule. For example, with reference to FIG. 2, an ion beam may extend from the cathode 212 to the target 206. That ion beam may create electrons owing to the ionization cross section of the ions in the beam with the surrounding hydrogen gas. Electrons produced by the (e.g., on-axis hydrogen) ion beam may be focused along the longitudinal axis of the radiation generator 200 and impact the (e.g., center of the) cathode 212. For example, an acceleration member (e.g., acceleration column 204) may be biased (e.g., a potential difference) to force positively charged particles (e.g., positively charged ions) towards the target such that a negatively charged particle (e.g., an electron) is swept in the opposite direction (e.g., toward the cathode 212). An ion beam may refer to a particle beam of positive ions that moves in the direction of decreasing electric potential.

A suppressor electrode 218 may restrict the backstreaming (where backstreaming may refer to flowing in an opposite direction of the target and/or an opposite direction of the flow of ions) of particles (e.g., electrons). In one aspect, backstreaming electrons are a beam of electrons that move in the direction of increasing electric potential. For example, where an ionization cross-section is much larger when the ion has a high kinetic energy, the majority of the electrons from the interaction of the ion beam with the (e.g., neutral hydrogen) gas in the radiation generator may be produced in the region proximal to and outside of the suppressor in the direction of the extractor. Such electrons may be tightly focused (e.g., in a beam having an outer diameter equal or less than the outer diameter of the cathode) on the longitudinal axis of the ion beam and thus return (e.g., be swept by the electric field from the acceleration member) to the ion source 202 with high energy. In certain aspects, these high energy, backstreaming electrons produce Bremsstrahlung (e.g., deceleration or braking radiation) X-ray radiation when stopped by the cathode. A radiation detector shown in FIGS. 2 and 3 may be used to detect (e.g., send an operation radiation signal in proportion to) at least some of the Bremsstrahlung radiation produced in the cathode. A radiation detector may be located so as to detect radiation (e.g., X-rays) generated from backstreaming electrons striking the cathode. Detection may include outputting an according signal based on the amount (e.g., energy or number of photons) of radiation detected. A radiation detector (e.g., a portion thereof facing the cathode) may include a radiation (e.g., X-ray) collimator. A collimator may restrict (e.g., prevent) the detection of radiation not generated by backstreaming particles (e.g., electrons) striking the cathode. In one aspect, a collimator for an X-ray radiation source is constructed of high Z (e.g., lead and/or tungsten) such that X-rays leaving the X-ray source (e.g., cathode) travel unimpeded from the X-ray source to the radiation detector. In one aspect, an x-ray collimator is a hollow high Z material cylinder placed between the cathode and the radiation detector such that X-rays coming from directions other than along the axis of the collimator would be absorbed (e.g., partially of totally) by the walls of the cylindrical W collimator.

Radiation detector may be disposed inside the chamber adjacent to the cathode or grid, e.g., as in FIG. 2. Radiation detector may be disposed outside the chamber adjacent to the cathode or grid, e.g., as in FIG. 3.

Depicted radiation generator 200 also includes a (e.g., high voltage) insulator 222, for example, to allow an ion source to be powered (e.g., at a level of desired potential) without the occurrence of sparks or other parasitic electrical discharge or leakage. In one aspect, insulator 222 extends around an interior of the radiation generator 200. The outer surface of a radiation generator may be a cylinder. Depicted radiation generator 200 includes an optional corona shield assembly 224 on the end of the neutron generator that is connected to the negative high voltage power supply.

FIG. 3 illustrates an aspect of a radiation (e.g., neutron) generator 300 according to the disclosure above, however the radiation detector 320 is disposed outside of the chamber (e.g., outside of the body of the radiation generator 300). Radiation detector may be mounted anywhere, including on or inside of a logging tool (e.g., logging tool 108 in FIG. 1). The remaining elements in FIG. 3 are according to the above disclosure and thus share the same reference characters as FIG. 2.

Figure 4:
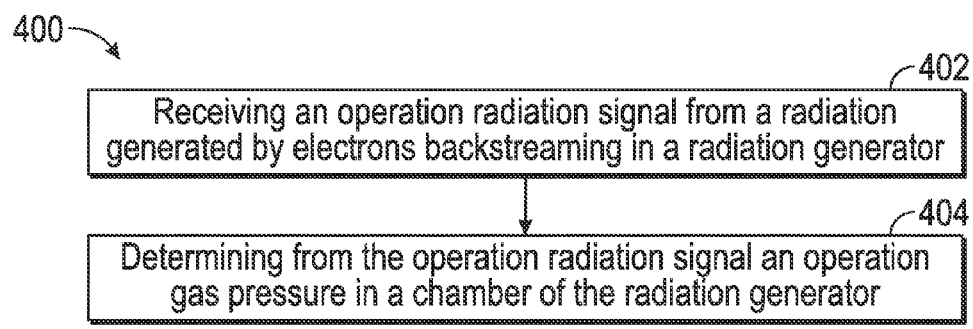
FIG. 4 illustrates an aspect of a method to determine an operation gas pressure in a chamber of a radiation generator.

FIG. 4 illustrates an aspect of a method 400 to determine an operation gas pressure in a chamber of a radiation generator. As noted above, an operation gas pressure may be a hydrogen gas pressure. Determining (e.g., continuously determining or determining at regular intervals such as, but not limited to at least once per second or once per minute) the pressure in a chamber of a radiation generator may allow the optimization of the performance of the radiation generator. Method 400 includes receiving an operation radiation signal from a radiation generated by electrons backstreaming in a radiation generator 402 and determining from the operation radiation signal an operation gas pressure in a chamber of the radiation generator 404. As noted above, an operation radiation signal may be a signal (e.g., a current and/or voltage) from a radiation detector corresponding to a sensed amount of radiation. Determining may include correlating a detected level (e.g., energy of a number of photons) of radiation (e.g., received from a radiation sensor) to a pressure value. In one aspect, the relationship between the detected level of radiation and the pressure value are functionally related (e.g., by a polynomial). In one aspect, an operation radiation signal (e.g., a level of radiation detected) is functionally related to a pressure value via a polynomial, for example, via a linear polynomial, a transform to a linear polynomial as is known in the art, or any other degree of polynomial. A constant or constants may be determined to provide a "fit" polynomial to correlate a signal for a detected level of radiation to a pressure value. A new pressure value may be determined from the polynomial with the determined constant or constants and an operation radiation signal (e.g., a detected level of radiation). A detected level of radiation may be the detected energy level of a given quantity of electromagnetic radiation.

For example, determining an operation gas pressure may include calculating a calibration value (e.g., a constant value) from a (e.g., a measured or known) calibration gas pressure in the chamber and a (e.g., measured or known) calibration radiation signal from a radiation generated by electrons backstreaming in the radiation generator, and ascertaining the operation gas pressure from the calibration value and the operation radiation signal. A calibration value (e.g., a constant) may be a value ascertained previously, for example, a value determined during manufacture of a radiation generator or a value determined from a set of known values, such as, but not limited to a, measured or known pressure, measured or known radiation signal, and/or measured or known power signal (e.g., measured or known current and/or voltage). If multiple calibration signals (e.g., calibration radiation signals) are utilized to find respective calibration values, each calibration value may be calculated using the same, single calibration signal or each calibration value may be calculated using a different calibration signal.

Figure 5:
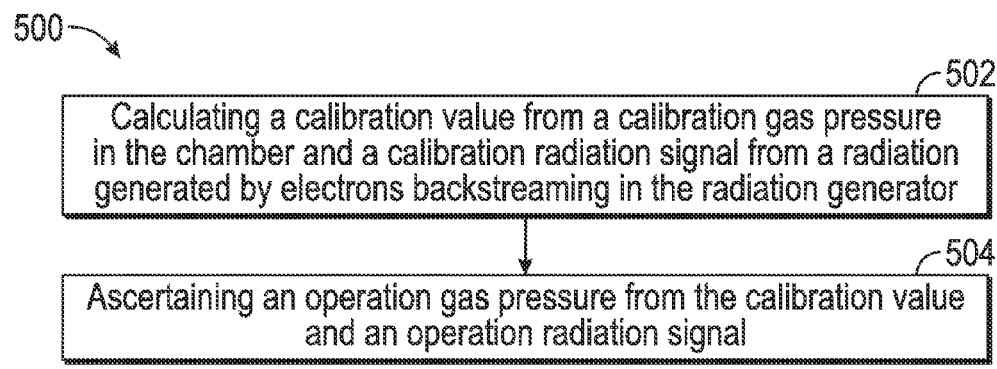
FIG. 5 illustrates an aspect of a method to ascertain an operation gas pressure in a chamber of a radiation generator.

FIG. 5 illustrates an aspect of a method 500 to ascertain an operation gas pressure in a chamber of a radiation generator that includes calculating a calibration value from a calibration gas pressure in the chamber and from a calibration radiation signal from a radiation generated by electrons backstreaming in the radiation generator 502, and ascertaining the operation gas pressure from the calibration value and an operation radiation signal 504.

Figure 6:
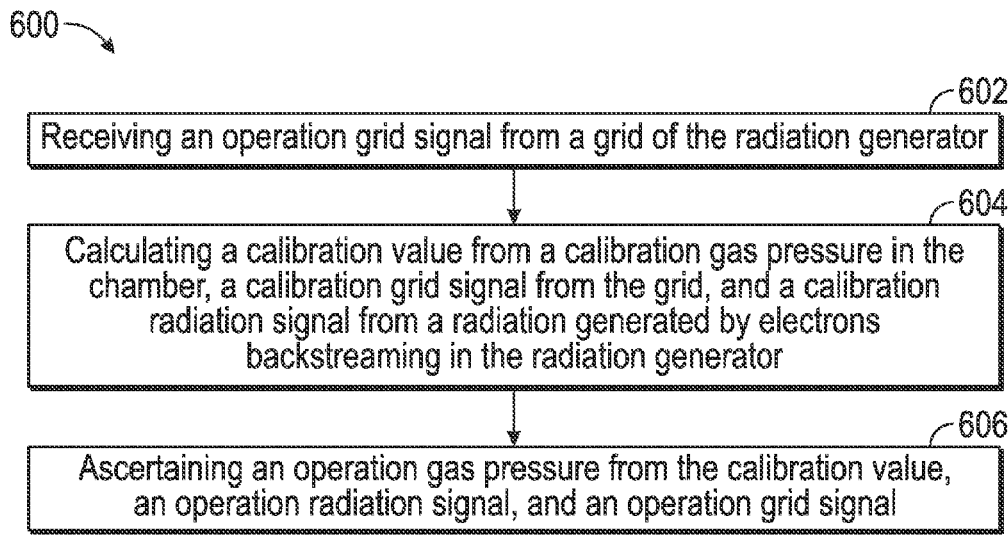
FIG. 6 illustrates an aspect of a method to ascertain an operation gas pressure in a chamber of a radiation generator.

FIG. 6 illustrates an aspect of a method 600 to ascertain an operation gas pressure in a chamber of a radiation generator that includes receiving an operation grid signal (e.g., a measured or known current and/or voltage) from a grid (e.g., grid 214 in FIGS. 2 and 3) of the radiation generator 602, calculating a calibration value from a calibration gas pressure (e.g., a measured or known pressure) in the chamber, a calibration grid signal (e.g., a measured or known current and/or voltage) from the grid, and a calibration radiation signal (e.g., a measured or known current and/or voltage) from a radiation generated by electrons backstreaming in the radiation generator 604, and ascertaining the gas pressure from the calibration value, an operation radiation signal, and an operation grid signal 606.

Figure 7:
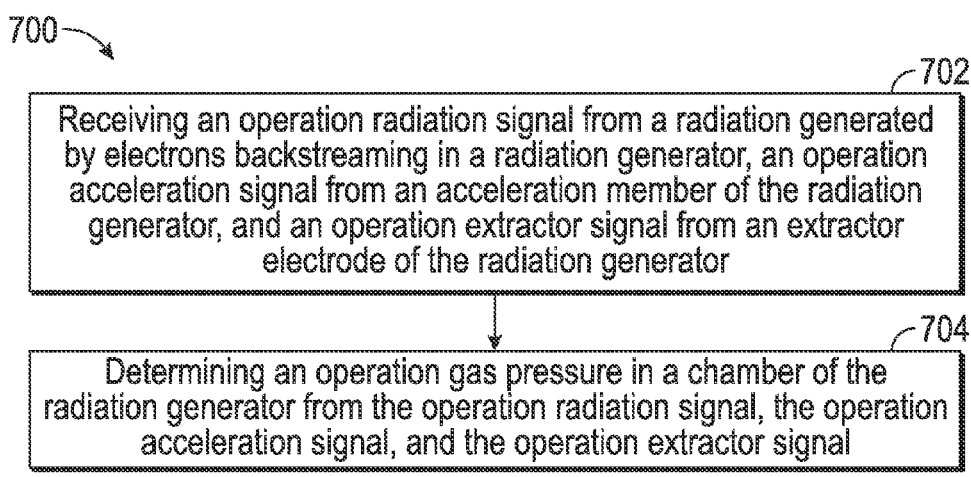
FIG. 7 illustrates an aspect of a method to determine an operation gas pressure in a chamber of a radiation generator.

FIG. 7 illustrates an aspect of a method 700 to determine an operation gas pressure in a chamber of a radiation generator that includes receiving an operation radiation signal (e.g., a measured or known current and/or voltage) from a radiation generated by electrons backstreaming in a radiation generator, an operation acceleration signal (e.g., a measured or known current and/or voltage) from an acceleration member of the radiation generator, and an operation extractor signal (e.g., a measured or known current and/or voltage) from an extractor electrode of the radiation generator 702, and determining an operation gas pressure in a chamber of the radiation generator from the operation radiation signal, the operation acceleration signal, and the operation extractor signal 704.

Figure 8:
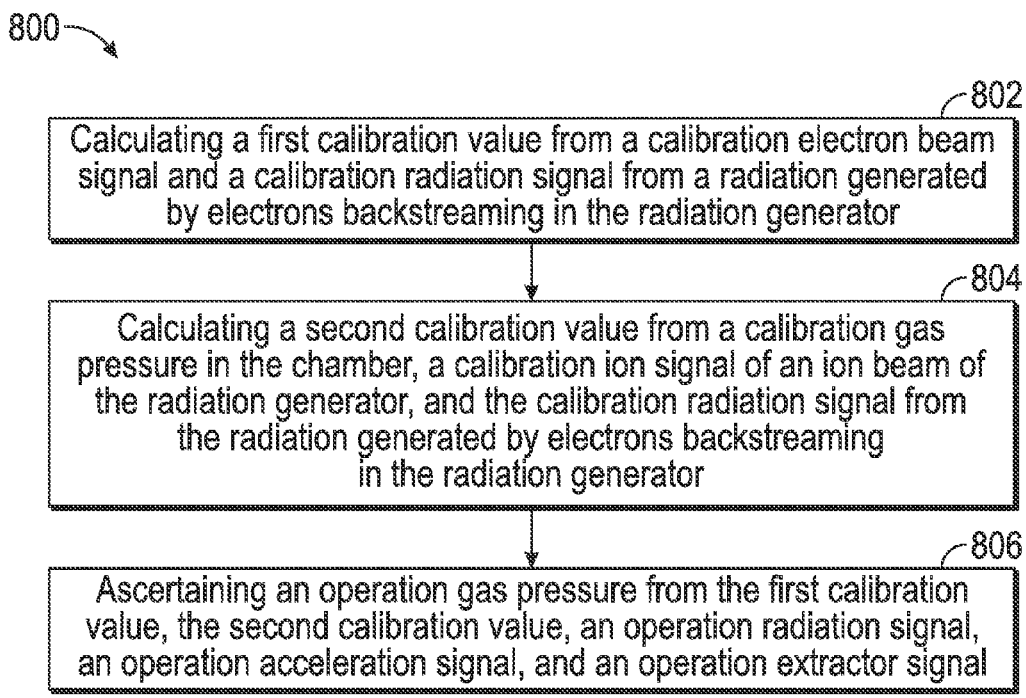
FIG. 8 illustrates an aspect of a method to ascertain an operation gas pressure in a chamber of a radiation generator.

FIG. 8 illustrates an aspect of a method 800 to ascertain an operation gas pressure in a chamber of a radiation generator that includes calculating a first calibration value from a calibration electron beam signal (e.g., a measured or known current and/or voltage) and a calibration radiation signal (e.g., a measured or known current and/or voltage) from a radiation generated by electrons backstreaming in the radiation generator 802, calculating a second calibration value from a calibration gas pressure (e.g., a measured or known pressure) in the chamber, a calibration ion signal (e.g., a measured or known current and/or voltage) of an ion beam of the radiation generator, and the calibration radiation signal from a radiation generated by electrons backstreaming in the radiation generator 804, and ascertaining an (e.g., unknown) operation gas pressure from the first calibration value, the second calibration value, an operation radiation signal, an operation acceleration signal, and an operation extractor signal 806.

In one aspect, which may include having a fixed acceleration voltage (e.g., supplied to the acceleration member), an operation radiation (e.g., detector) signal comprises a radiation detector current IRAD and is linearly proportional to a backstreaming high energy electron beam signal (e.g., current Ie) flowing along a longitudinal axis of a radiation generator into its cathode via a constant (C1). That is, IRAD=C1*Ie. The * symbol referring to multiplication. Note: the subscript numbers utilized after a constant in this disclosure are for the convenience of reference, so that referring to a constant as C2 does not mean the use of a constant C1, etc. as well. The operation electron beam signal (e.g., current Ie) in this aspect may be linearly proportional to the product of the (e.g., hydrogen) gas pressure (P) in the radiation generator and the ion signal (e.g., current IION) of the ion beam via a constant (C2). That is, IRAD=C1*Ie=C2*P*IION. Where a constant(s) may be a calibration value, e.g., to calibrate a (e.g., linear) polynomial to fit the available parameters. In order to determine (e.g., ascertain) a (e.g., unknown) gas pressure (P), the ion signal (e.g., current IION) may be written as a function of measured or known parameters. Two methods are as follows.

In a first method, an ion signal (e.g., current IION) of an ion beam in a radiation detector (e.g., a neutron detector) is linearly proportional to the product of the operation grid signal (e.g., current IGRID) and the operation gas pressure (P) at a fixed grid voltage via a constant (C3). That is, IION=C3*IGRID*P. Accordingly from the paragraph above, if IRAD=C2*P*IION, then IRAD=C2*C3*IGRID*P^2. It follows that P=C4*√(IRAD/IGRID). Where the / symbol means division and the √ symbol means the square root. The constant C4 may be measured before an unknown pressure is determined, e.g., by calculating C4 from calibration (e.g., known) values of P, radiation signal (e.g., current IRAD), and grid signal (e.g., current IGRID). As a further example, for a fixed grid signal (e.g., fixed current IGRID), the operation gas pressure (P) may be linearly proportional to the square root of the operation radiation signal (e.g., current IRAD) via constant (C5). That is, P=C5*√IRAD. Where the √ symbol means the square root. The constant C5 may be measured before an unknown pressure is determined, e.g., by calculating C5 from calibration (e.g., known) values of P and radiation signal (e.g., current IRAD). Accordingly, P/P=0.5*IRAD/IRAD such that a 2% change in the current IRAD gives a 1% change in P. One or more of these relationships may be used to find a (e.g., unknown) pressure value at a given value of an operation radiation signal (e.g., radiation current and/or voltage). Accordingly, the pressure (P) of the (e.g., hydrogen) gas in a chamber of a radiation generator may be (e.g., continuously) determined.

In a second method, an operation electron beam signal (e.g., current Ie) corresponds to electrons backstreaming along the longitudinal axis of an ion beam of a radiation generator. For example, backstreaming electrons may be created by an (e.g., hydrogen) ion beam as it passes through a (e.g., neutral hydrogen) gas on the way to the target. According to one aspect, there may be many (e.g., physical) interactions of the fast moving ions with the surrounding hydrogen gas. The different reactions may be classified according to results of the interaction. Interactions that release electrons may be referred to as ionization reactions. A charge exchange reaction may refer to an electron jumping from a neutral hydrogen gas molecule onto a fast moving ion as it passes nearby. In such an aspect, the fast moving ion and electron together are a fast neutral particle. Backstreaming electrons may come from the interactions that have a free electron in the final state, for example, where the dominant cross-section is an H2 ion and an H2 molecule forming two H2 ions. Electrons may be backstreaming in at least one of the ion source and the acceleration member. In one aspect, e.g., for a fixed acceleration member voltage, the (e.g., Bremsstrahlung) radiation signal (e.g., intensity thereof) (e.g., current IRAD) is linearly proportional to the operation electron beam signal (e.g., current Ie) via a constant (C1). That is, IRAD=C1*Ie. A constant value may be determined by any means, such as those discussed herein. Note that any similarly named constants here are not necessarily that same constants as are discussed in the first method above, or vice-versa. The term constant may refer to a constant determined for a particular radiation generator. In an aspect of the second method, the operation electron beam signal (e.g., current Ie) is linearly proportional to the product of the (e.g., hydrogen) gas pressure (P) in the radiation generator and the ion signal (e.g., current IION) of the ion beam via a constant (C2). That is, IRAD=C1*Ie=C2*P*IION. Where a constant(s) may be a calibration value, e.g., to calibrate a (e.g., linear) polynomial to fit the available parameters. In certain aspects, an operation acceleration signal (e.g., acceleration current IACCEL) (e.g., a high voltage power supply current and/or voltage delivered to an acceleration member) is linearly proportional to the sum of the operation electron beam signal (e.g., current Ie), the ion signal (e.g., current IION of the ion beam), and the operation extractor signal (e.g., current IEXT). That is, IACCEL=Ie+IION+IEXT. Utilizing the equations above in this paragraph, e.g., for a fixed acceleration signal (e.g., voltage) applied to the acceleration member, the (e.g., hydrogen) gas pressure (P) in the radiation generator can be written as a linear polynomial (i.e., linearly proportional) in terms of the (e.g., measured or known) quantities of an operation radiation signal (e.g., current IRAD), an operation acceleration signal (e.g., current IACCEL), an operation extractor signal (e.g., current IEXT intercepted by the extractor), constant (C1), and constant (C2). That is, P=IRAD/(C2*[IACCEL−{IRAD/C1}−IEXT]). Accordingly, the pressure (P) of the (e.g., hydrogen) gas in a chamber of a radiation generator may be (e.g., continuously) determined.

A constant(s) may be a calibration value, e.g., to calibrate a (e.g., linear) polynomial to fit (e.g., a "fit curve" for) the available parameters. A calibration value (e.g., a constant) may be a value ascertained previously, for example, a value determined during manufacture of a radiation generator or a value determined from a set of known values, such as, but not limited to, measured or known pressure, measured or known radiation signal, and/or measured or known power signal (e.g., measured or known current and/or voltage).

In certain aspects, when it is desired to determine (e.g., extrapolate) a pressure of a chamber of a radiation generator, an extractor electrode (e.g., the extractor electrodes if a plurality are utilized) of the radiation generator may be operated (e.g., at a potential) so substantially no electrons from a cathode is intercepted by the extractor electrode. For example, if a cathode is at ground potential, then the extractor electrode may be at a negative potential. A negative potential on the extractor electrode may enhance the extraction on (e.g., hydrogen) ions created in an ion source. In one aspect, when a grid potential is reduced to zero, the extractor potential may be at a positive potential to sharply turn off the radiation (e.g., neutron or gamma ray) output of a radiation generator.

A suppressor electrode may be of a selected shape and/or size such that an (e.g., substantially any) electron emitted from its surface will be intercepted by the extractor electrode. In such an aspect, an operation extractor signal (e.g., current $I_{EXT}$) may be substantially entirely due to electrons that (i) are emitted or ejected from a suppressor electrode, (ii) travel along the surface of the insulated acceleration member (e.g., acceleration column), or (iii) are ejected by energetic (e.g., hydrogen) ions, atoms, or molecules that interact with (e.g., neutral hydrogen) gas off the longitudinal axis of the ion beam in the radiation generator. Accordingly, those backstreaming electrons produced by the on-axis (e.g., hydrogen) ion beam will be focused on the longitudinal axis and thus generate radiation when stopped by the cathode. The same approach can be used with an intermediate electrode radiation generator, e.g., when the intermediate electrode is left floating, for example, unconnected to a power supply. Examples of intermediate electrode radiation generators are in U.S. Patent Application Publication Number 2011/0114830, which is hereby incorporated by reference in its entirety.

Note that if the pressure is determined (e.g., ascertained) by the disclosure herein, e.g., as opposed to directly sensing {e.g., measuring} the pressure with a pressure sensor, the equation stating $I_{ACCEL}=I_e+I_{ION}+I_{EXT}$ may be rearranged to find a calculated (e.g., instead of a measured or known) extractor signal (e.g., $I_{EXT-C}$ where the subscript -C refers to being calculated). Particularly, the calculated extractor signal (e.g., $I_{EXT-C}$) may be linearly proportional to the operation electron beam signal (e.g., current $I_e$), the ion signal (e.g., current $I_{ION}$ of the ion beam), and the operation acceleration signal (e.g., current $I_{ACCEL}$). That is, $I_{EXT-C}=I_{ACCEL}-I_e-I_{ION}$. Substituting with the relevant equations above, $I_{EXT-C}=I_{ACCEL}-(I_{RAD}/C_1)-C_3*C_5*I_{GRID}*\sqrt{V_{RAD}}$. Where the √ symbol means the square root. Thus, the calculated value of extractor current $I_{EXT-C}$ may be the sum of the current that is not included in $I_{ION}$ and in generating (e.g., Bremsstrahlung) radiation that gives $I_{RAD}$. In general, $I_{EXT-C}$ may be equal to the measured value of $I_{EXT}$. However, if there are power issues, such as, but not limited to, charge leakage through the insulating system around the radiation generator or through the acceleration member (e.g., a high voltage ladder powering the acceleration member) to ground, then $I_{ACCEL}$ may include this leakage current, and thus causing $I_{EXT-C}$ to be larger than the measured value of $I_{EXT}$. Thus, a comparison (e.g., the absolute value of the difference therebetween, mean squared error therebetween, etc.) of $I_{EXT}$ and $I_{EXT-C}$, may be used to identify functional issues with a radiation generator, such as the origin of high voltage leakage events and/or for quality monitoring and control. A maximum allowed difference therebetween may be selected, e.g., to allow a signal (e.g., an alert such a visual and/or audible output) to indicate a functional issue with the radiation generator or to initiate remedial measure to repair the functional issue.

As above, note that a constant(s) may be a calibration value, e.g., to calibrate a (e.g., linear) polynomial to fit the available parameters. A calibration value (e.g., a constant) may be a value ascertained previously, for example, a value determined during manufacture of a radiation generator or a value determined from a set of known values, such as, but not limited to, measured or known pressure, measured or known radiation signal, and/or measured or known power signal (e.g., measured or known current).

Figure 9:
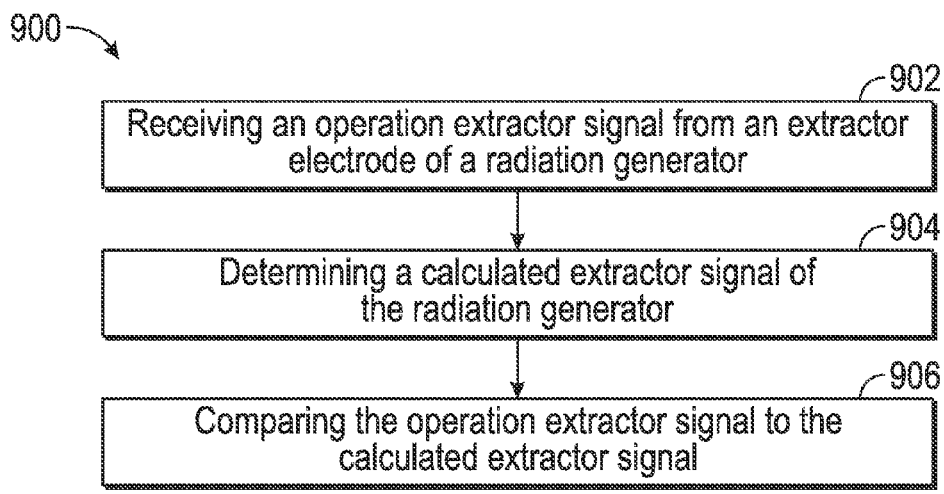
FIG. 9 illustrates an aspect of a method to compare an operation extractor signal to a calculated extractor signal of a radiation generator.

Turning to FIG. 9, it illustrates an aspect of a method 900 to compare an operation extractor signal to a calculated extractor signal of a radiation generator. Particularly, method 900 includes receiving an operation extractor signal from an extractor electrode of a radiation generator 902, determining a calculated extractor signal (e.g., $I_{EXT-C}$) of the radiation generator 904, and comparing the operation extractor signal (e.g., $I_{EXT}$) to the calculated extractor signal 906.

Figure 10:
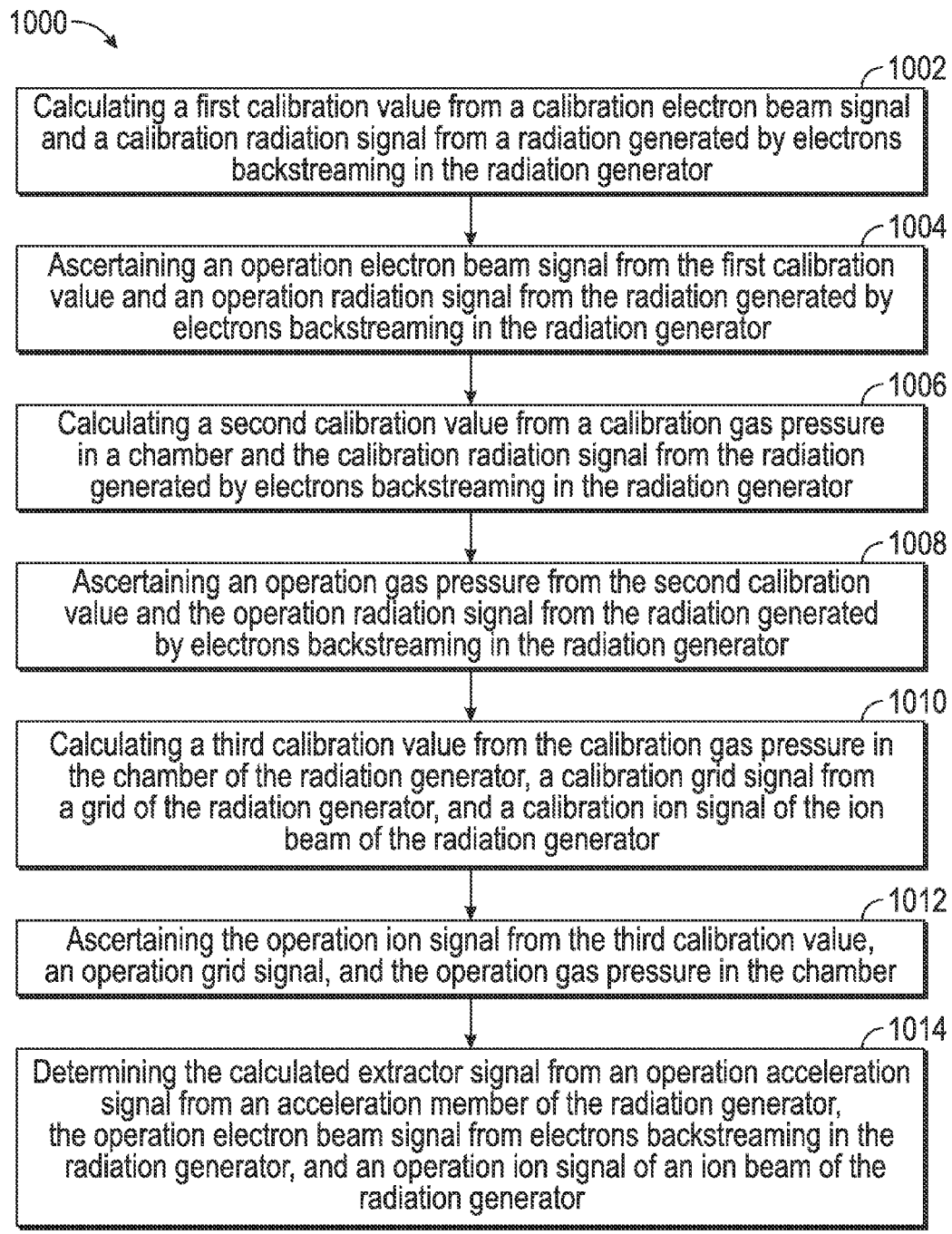
FIG. 10 illustrates an aspect of a method to determine a calculated extractor signal of a radiation generator.

FIG. 10 illustrates an aspect of a method 1000 to determine a calculated extractor signal of a radiation generator. Particularly, method 1000 includes calculating a first calibration value from a calibration electron beam signal and a calibration radiation signal from a radiation generated by electrons backstreaming in the radiation generator 1002, ascertaining an operation electron beam signal from the first calibration value and an operation radiation signal from a radiation generated by electrons backstreaming in the radiation generator 1004, calculating a second calibration value from a calibration gas pressure in a chamber and the calibration radiation signal from a radiation generated by electrons backstreaming in the radiation generator 1006, ascertaining an operation gas pressure from the second calibration value and the operation radiation signal from a radiation generated by electrons backstreaming in the radiation generator 1008, calculating a third calibration value from the calibration gas pressure in the chamber of the radiation generator, a calibration grid signal from a grid of the radiation generator, and a calibration ion signal of the ion beam of the radiation generator 1010, ascertaining the ion signal from the third calibration value, an operation grid signal, and the operation gas pressure in the chamber 1012, and determining the calculated extractor signal from an operation acceleration signal from an acceleration member of the radiation generator, the operation electron beam signal from electrons backstreaming in the radiation generator, and an operation ion signal of an ion beam of the radiation generator 1014.

Figure 11:
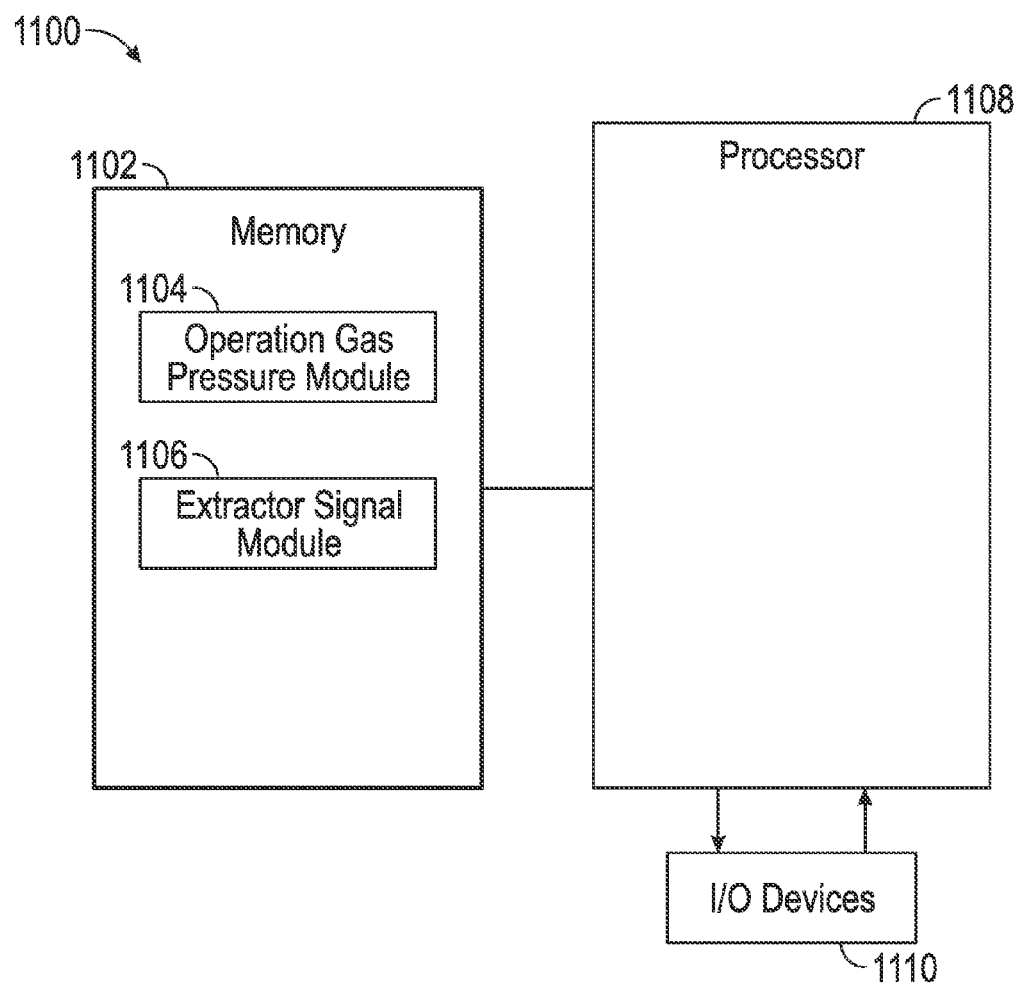
FIG. 11 illustrates an aspect of a block diagram of a computer architecture.

FIG. 11 illustrates an aspect of a block diagram 1100 of a computer architecture. Various I/O devices 1110 may be coupled (e.g., via a bus) to processor 1108, for example, a keyboard, mouse, audio device, display device, and/or communication device. Memory 1102 may be coupled to processor. Memory 1102 may include a disk drive or other (e.g., mass) data storage device which may include instructions/ code and data, in one aspect. Note that other architectures are possible.

Aspects of the disclosure disclosed herein may be implemented in hardware, software, firmware, or a combination of such implementation approaches. Aspects of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions and methods described herein and generate output information (e.g., an operation gas pressure). The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. The disclosure herein is not limited in scope to any particular programming language. The language may be a compiled or interpreted language.

One or more aspects of at least one aspect may be implemented by representative instructions stored on a machine-readable medium which represents various logic within the processor, which when read by a machine causes the machine to fabricate logic to perform the techniques described herein. Such implementations may be stored on a tangible, machine readable medium.

Such machine-readable storage mediums may include, without limitation, non-transitory, tangible arrangements of articles manufactured or formed by a machine or device, including storage media such as hard disks, any other type of disk including floppy disks, optical disks, compact disks (e.g., CD-ROMs or CD-RWs), and magneto-optical disks, semiconductor devices such as read memories (ROMs, random access memories (RAMs) such as dynamic random access memories (DRAMs), static random access memories (SRAMs), erasable programmable read memories (EPROMs), flash memories, electrically erasable programmable read memories (EEPROMs), phase change memory (PCM), magnetic or optical cards, or any other type of media suitable for storing electronic instructions.

Accordingly, aspects of the disclosure also include non-transitory, tangible machine-readable media containing instructions or containing design data, such as Hardware Description Language (HDL), which defines structures, circuits, apparatuses, processors and/or system features described herein. Such aspects may also be referred to as program products. The modules may be implemented in software, hardware, firmware, or a combination thereof. The instruction converter may be on processor, off processor, or part on and part off processor.

In one aspect, memory 1102 is a non-transitory machine readable storage medium having instructions that, when executed, causes a machine to perform a method according to the above disclosure. Particularly, memory 1102 may contain an operation gas pressure module 1104, an extractor signal module 1106, or both. Gas Pressure Module 1104 may include instructions that, when executed, causes the processor to perform a method of determining an operation gas pressure in a radiation generator, e.g., according to the disclosure above. Extractor Signal Module 1106 may include instructions that, when executed, causes the processor to perform a method of determining an operation extractor signal (e.g., current $I_{EXT-C}$) of a radiation generator, e.g., according to the disclosure above. Gas pressure module 1104 may include instructions that, when executed, causes the processor to perform a method of comparing a calculated extractor signal (e.g., current $I_{EXT-C}$) with a received (e.g., measured or known) extractor signal (e.g., current $I_{EXT}$) of a radiation generator, e.g., according to the disclosure above.

In one aspect, a radiation generator includes an ion source, a target, and an acceleration member between the ion source and the target, and a radiation detector to detect a radiation generated by backstreaming electrons. The radiation detector may output an operation radiation signal from a photon. The radiation detector may include a filter to restrict detection of a photon not from a cathode of the radiation generator. The radiation detector may include a connector to connect to a data acquisition system. Data acquisition system may record a signal(s) from the radiation detector and/or generator. The radiation detector may be disposed within a chamber of the radiation generator.

In one aspect, a method includes receiving an operation radiation signal from a radiation generated by electrons backstreaming in a radiation generator, and determining from the operation radiation signal an operation gas pressure in a chamber of the radiation generator. The determining may include calculating a calibration value from a calibration gas pressure in the chamber and a calibration radiation signal from the radiation generated by electrons backstreaming in the radiation generator, and ascertaining the operation gas pressure from the calibration value and the operation radiation signal. The method may include receiving an operation grid signal from a grid of the radiation generator. The determining may include calculating a calibration value from a calibration gas pressure in the chamber, a calibration grid signal from the grid, and a calibration radiation signal from the radiation generated by electrons backstreaming in the radiation generator, and ascertaining the operation gas pressure from the calibration value, the operation radiation signal, and the operation grid signal. The method may include supplying the operation grid signal to the grid of the radiation generator at a substantially fixed rate. The operation radiation signal may be from a photon. The method may include filtering the operation radiation signal to restrict detection of a photon not from a cathode of the radiation generator. The method may include disposing the radiation generator into a wellbore in a formation. The receiving may include receiving the operation radiation signal from a radiation detector disposed within the chamber of the radiation generator. The method may include controlling a power supplied to the radiation generator to maintain the operation gas pressure at a selected gas pressure or below the selected gas pressure.

In one aspect, a non-transitory machine readable storage medium having instructions that, when executed, causes a machine to perform a method including receiving an operation radiation signal from a radiation generated by electrons backstreaming in a radiation generator, and determining from the operation radiation signal an operation gas pressure in a chamber of the radiation generator. The determining may include calculating a calibration value from a calibration gas pressure in the chamber and a calibration radiation signal from the radiation generated by electrons backstreaming in the radiation generator, and ascertaining the operation gas pressure from the calibration value and the operation radiation signal. The determining may include receiving an operation grid signal from a grid of the radiation generator. The determining may include calculating a calibration value from a calibration gas pressure in the chamber, a calibration grid signal from the grid, and a calibration radiation signal from the radiation generated by electrons backstreaming in the radiation generator, and ascertaining the operation gas pressure from the calibration value, the operation radiation signal, and the operation grid signal. The method may include supplying the operation grid signal to the grid of the radiation generator at a substantially fixed rate. The operation radiation signal may be from a photon. The method may include filtering the operation radiation signal to restrict detection of a photon not from a cathode of the radiation generator. The radiation generator may be disposed in a wellbore in a formation. The receiving may include receiving the operation radiation signal from a radiation detector disposed within the chamber of the radiation generator. The method may include controlling a power supplied to the radiation generator to maintain the operation gas pressure at a selected gas pressure or below the selected gas pressure.

In one aspect, a method includes receiving an operation radiation signal from a radiation generated by electrons backstreaming in a radiation generator, an operation acceleration signal from an acceleration member of the radiation generator, and an operation extractor signal from an extractor electrode of the radiation generator, and determining an operation gas pressure in a chamber of the radiation generator from the operation radiation signal, the operation acceleration signal, and the operation extractor signal. The determining may include calculating a first calibration value from a calibration electron beam signal and a calibration radiation signal from the radiation generated by electrons backstreaming in the radiation generator. The determining may include calculating a second calibration value from a calibration gas pressure in the chamber, a calibration ion signal of an ion beam of the radiation generator, and the calibration radiation signal from the radiation generated by electrons backstreaming in the radiation generator. The determining may include ascertaining the operation gas pressure from the first calibration value, the second calibration value, the operation radiation signal, the operation acceleration signal, and the operation extractor signal. The method may include supplying an acceleration voltage to the acceleration member at a substantially fixed rate. The operation radiation signal may be from a photon. The method may include filtering the operation radiation signal to restrict detection of a photon not from a cathode of the radiation generator. The method may include disposing the radiation generator into a wellbore in a formation. The receiving may include receiving the operation radiation signal from a radiation detector disposed within the chamber of the radiation generator. The method may include controlling a power supplied to the radiation generator to maintain the operation gas pressure at a selected gas pressure or below the selected gas pressure.

In one aspect, a non-transitory machine readable storage medium having instructions that, when executed, causes a machine to perform a method including receiving an operation radiation signal from a radiation generated by electrons backstreaming in a radiation generator, an operation acceleration signal from an acceleration member of the radiation generator, and an operation extractor signal from an extractor electrode of the radiation generator, and determining an operation gas pressure in a chamber of the radiation generator from the operation radiation signal, the operation acceleration signal, and the operation extractor signal. The determining may include calculating a first calibration value from a calibration electron beam signal and a calibration radiation signal from the radiation generated by electrons backstreaming in the radiation generator. The determining may include calculating a second calibration value from a calibration gas pressure in the chamber, a calibration ion signal of an ion beam of the radiation generator, and the calibration radiation signal from the radiation generated by electrons backstreaming in the radiation generator. The determining may include ascertaining the operation gas pressure from the first calibration value, the second calibration value, the operation radiation signal, the operation acceleration signal, and the operation extractor signal. The method may include supplying an acceleration voltage to the acceleration member at a substantially fixed rate. The operation radiation signal may be from a photon. The method may include filtering the operation radiation signal to restrict detection of a photon not from a cathode of the radiation generator. The method may include disposing the radiation generator into a wellbore in a formation. The receiving may include receiving the operation radiation signal from a radiation detector disposed within the chamber of the radiation generator. The method may include controlling a power supplied to the radiation generator to maintain the operation gas pressure at a selected gas pressure or below the selected gas pressure.

In one aspect, a method includes receiving an operation extractor signal from an extractor electrode of a radiation generator, determining a calculated extractor signal of the radiation generator, and comparing the operation extractor signal to the calculated extractor signal. The comparing may include subtracting the operation extractor signal from the calculated extractor signal. The method may include generating an alert when a result of the subtracting of the operation extractor signal from the calculated extractor signal exceeds a threshold value. The determining may include determining the calculated extractor signal from at least one of an operation acceleration signal from an acceleration member of the radiation generator, an operation electron beam signal from electrons backstreaming in the radiation generator, and an ion signal of an ion beam of the radiation generator. The determining may include determining the calculated extractor signal from an operation acceleration signal from an acceleration member of the radiation generator, an operation electron beam signal from electrons backstreaming in the radiation generator, and an ion signal of an ion beam of the radiation generator. The determining may include calculating a first calibration value from a calibration electron beam signal and a calibration radiation signal from a radiation generated by electrons backstreaming in the radiation generator, and ascertaining the operation electron beam signal from the first calibration value and an operation radiation signal from a radiation generated by electrons backstreaming in the radiation generator. The determining may include calculating a second calibration value from a calibration gas pressure in a chamber of the radiation generator, a calibration grid signal from a grid of the radiation generator, and a calibration ion signal of the ion beam of the radiation generator, and ascertaining the ion signal from the second calibration value, an operation grid signal from the grid of the radiation generator, and an operation gas pressure in the chamber. The determining may include calculating a third calibration value from the calibration gas pressure in the chamber and a calibration radiation signal from a radiation generated by electrons backstreaming in the radiation generator, and ascertaining the operation gas pressure from the third calibration value and an operation radiation signal from the radiation generated by electrons backstreaming in the radiation generator. The determining may include calculating a first calibration value from a calibration electron beam signal and a calibration radiation signal from a radiation generated by electrons backstreaming in the radiation generator, ascertaining the operation electron beam signal from the first calibration value and an operation radiation signal from the radiation generated by electrons backstreaming in the radiation generator, calculating a second calibration value from a calibration gas pressure in a chamber and the calibration radiation signal from the radiation generated by electrons backstreaming in the radiation generator, ascertaining the operation gas pressure from the second calibration value and the operation radiation signal from the radiation generated by electrons backstreaming in the radiation generator, calculating a third calibration value from the calibration gas pressure in the chamber of the radiation generator, a calibration grid signal from a grid of the radiation generator, and a calibration ion signal of the ion beam of the radiation generator, and ascertaining the ion signal from the third calibration value, the operation grid signal, and the operation gas pressure in the chamber.

In one aspect, a non-transitory machine readable storage medium having instructions that, when executed, causes a machine to perform a method including receiving an operation extractor signal from an extractor electrode of a radiation generator, determining a calculated extractor signal of the radiation generator, and comparing the operation extractor signal to the calculated extractor signal. The comparing of the method may include subtracting the operation extractor signal from the calculated extractor signal. The method may include generating an alert when a result of the subtracting of the operation extractor signal from the calculated extractor signal exceeds a threshold value. The determining may include determining the calculated extractor signal from at least one of an operation acceleration signal from an acceleration member of the radiation generator, an operation electron beam signal from electrons backstreaming in the radiation generator, and an ion signal of an ion beam of the radiation generator. The determining may include determining the calculated extractor signal from an operation acceleration signal from an acceleration member of the radiation generator, an operation electron beam signal from electrons backstreaming in the radiation generator, and an ion signal of an ion beam of the radiation generator. The determining may include calculating a first calibration value from a calibration electron beam signal and a calibration radiation signal from a radiation generated by electrons backstreaming in the radiation generator, and ascertaining the operation electron beam signal from the first calibration value and an operation radiation signal from the radiation generated by electrons backstreaming in the radiation generator. The determining may include calculating a second calibration value from a calibration gas pressure in a chamber of the radiation generator, a calibration grid signal from a grid of the radiation generator, and a calibration ion signal of the ion beam of the radiation generator, and ascertaining the ion signal from the second calibration value, the operation grid signal, and an operation gas pressure in the chamber. The determining may include calculating a third calibration value from the calibration gas pressure in the chamber and a calibration radiation signal from a radiation generated by electrons backstreaming in the radiation generator, and ascertaining the operation gas pressure from the third calibration value and an operation radiation signal from the radiation generated by electrons backstreaming in the radiation generator. The determining may include calculating a first calibration value from a calibration electron beam signal and a calibration radiation signal from a radiation generated by electrons backstreaming in the radiation generator, ascertaining the operation electron beam signal from the first calibration value and an operation radiation signal from the radiation generated by electrons backstreaming in the radiation generator, calculating a second calibration value from a calibration gas pressure in a chamber and the calibration radiation signal from the radiation generated by electrons backstreaming in the radiation generator, ascertaining the operation gas pressure from the second calibration value and the operation radiation signal from the radiation generated by electrons backstreaming in the radiation generator, calculating a third calibration value from the calibration gas pressure in the chamber of the radiation generator, a calibration grid signal from a grid of the radiation generator, and a calibration ion signal of the ion beam of the radiation generator, and ascertaining the ion signal from the third calibration value, the operation grid signal, and the operation gas pressure in the chamber.

In one aspect, an apparatus includes a set of one or more processors, and a set of one or more data storage devices that store instructions, that when executed by the set of processors, cause the set of processors to perform the following: determining a calculated extractor signal of a radiation generator, and comparing the calculated extractor signal to an operation extractor signal from an extractor electrode of the radiation generator. The set of data storage devices may further store instructions, that when executed by the set of processors, cause the set of processors to perform the following: wherein the comparing comprises subtracting the operation extractor signal from the calculated extractor signal. The set of data storage devices may further store instructions, that when executed by the set of processors, cause the set of processors to perform the following: generating an alert when a result of the subtracting of the operation extractor signal from the calculated extractor signal exceeds a threshold value. The set of data storage devices may further store instructions, that when executed by the set of processors, cause the set of processors to perform the following: wherein the determining comprises determining the calculated extractor signal from at least one of an operation acceleration signal from an acceleration member of the radiation generator, an operation electron beam signal from electrons backstreaming in the radiation generator, and an ion signal of an ion beam of the radiation generator. The set of data storage devices may further stores instructions, that when executed by the set of processors, cause the set of processors to perform the following: wherein the determining comprises determining the calculated extractor signal from an operation acceleration signal from an acceleration member of the radiation generator, an operation electron beam signal from electrons backstreaming in the radiation generator, and an ion signal of an ion beam of the radiation generator. The set of data storage devices may further store instructions, that when executed by the set of processors, cause the set of processors to perform the following: wherein the determining further comprises: calculating a first calibration value from a calibration electron beam signal and a calibration radiation signal from a radiation generated by electrons backstreaming in the radiation generator, and ascertaining the operation electron beam signal from the first calibration value and an operation radiation signal from a radiation generated by electrons backstreaming in the radiation generator. The set of data storage devices may further store instructions, that when executed by the set of processors, cause the set of processors to perform the following: wherein the determining further comprises calculating a second calibration value from a calibration gas pressure in a chamber of the radiation generator, a calibration grid signal from a grid of the radiation generator, and a calibration ion signal of the ion beam of the radiation generator, and ascertaining the ion signal from the second calibration value, an operation grid signal from the grid of the radiation generator, and an operation gas pressure in the chamber. The set of data storage devices may further store instructions, that when executed by the set of processors, cause the set of processors to perform the following: wherein the determining further comprises calculating a third calibration value from the calibration gas pressure in the chamber and a calibration radiation signal from a radiation generated by electrons backstreaming in the radiation generator, and ascertaining the operation gas pressure from the third calibration value and an operation radiation signal from the radiation generated by electrons backstreaming in the radiation generator. The set of data storage devices further stores instructions, that when executed by the set of processors, cause the set of processors to perform the following: wherein the determining further comprises calculating a first calibration value from a calibration electron beam signal and a calibration radiation signal from a radiation generated by electrons backstreaming in the radiation generator, ascertaining the operation electron beam signal from the first calibration value and an operation radiation signal from the radiation generated by electrons backstreaming in the radiation generator, calculating a second calibration value from a calibration gas pressure in a chamber and the calibration radiation signal from the radiation generated by electrons backstreaming in the radiation generator, ascertaining the operation gas pressure from the second calibration value and the operation radiation signal from the radiation generated by electrons backstreaming in the radiation generator, calculating a third calibration value from the calibration gas pressure in the chamber of the radiation generator, a calibration grid signal from a grid of the radiation generator, and a calibration ion signal of the ion beam of the radiation generator, and ascertaining the ion signal from the third calibration value, the operation grid signal, and the operation gas pressure in the chamber.

What is claimed is:

1. A neutron radiation generator comprising:
   an ion source, a target, and an acceleration member between the ion source and the target; and
   a radiation detector to detect a radiation generated by backstreaming electrons in at least one of the ion source and the acceleration member.

2. The neutron radiation generator of claim 1, wherein the radiation detector outputs an operation radiation signal from detection of a photon.

3. The neutron radiation generator of claim 2, wherein the radiation detector comprises a filter to restrict detection of a photon not from a cathode of the neutron radiation generator.

4. The neutron radiation generator of claim 1, further comprising a connector to connect to a data acquisition system.

5. The neutron radiation generator of claim 1, wherein the radiation detector is disposed within a chamber of the neutron radiation generator.

6. A method comprising:
   receiving an operation radiation signal from a radiation generated by electrons backstreaming in a radiation generator; and
   determining from the operation radiation signal an operation gas pressure in a chamber of the radiation generator.

7. The method of claim 6, wherein the determining comprises:
   calculating a calibration value from a calibration gas pressure in the chamber and a calibration radiation signal from the radiation generated by electrons backstreaming in the radiation generator; and
   ascertaining the operation gas pressure from the calibration value and the operation radiation signal.

8. The method of claim 6, further comprising receiving an operation grid signal from a grid of the radiation generator and wherein the determining comprises:
   calculating a calibration value from a calibration gas pressure in the chamber, a calibration grid signal from the grid, and a calibration radiation signal from the radiation generated by electrons backstreaming in the radiation generator; and
   ascertaining the operation gas pressure from the calibration value, the operation radiation signal, and the operation grid signal.

9. The method of claim 8, further comprising supplying the operation grid signal to the grid of the radiation generator at a substantially fixed rate.

10. The method of claim 6, wherein the operation radiation signal is from detection of a photon.

11. The method of claim 10, further comprising filtering the operation radiation signal to restrict detection of a photon not from a cathode of the radiation generator.

12. The method of claim 6, further comprising disposing the radiation generator into a wellbore in a formation.

13. The method of claim 6, wherein the receiving comprises receiving the operation radiation signal from a radiation detector disposed within the chamber of the radiation generator.

14. The method of claim 6, further comprising controlling a power supplied to the radiation generator to maintain the operation gas pressure at a selected gas pressure or below the selected gas pressure.

15. A method comprising:
   receiving an operation radiation signal from a radiation generated by electrons backstreaming in a radiation generator, an operation acceleration signal from an acceleration member of the radiation generator, and an operation extractor signal from an extractor electrode of the radiation generator; and
   determining an operation gas pressure in a chamber of the radiation generator from the operation radiation signal, the operation acceleration signal, and the operation extractor signal.

16. The method of claim 15, wherein the determining comprises calculating a first calibration value from a calibration electron beam signal and a calibration radiation signal from the radiation generated by electrons backstreaming in the radiation generator.

17. The method of claim 16, wherein the determining further comprises calculating a second calibration value from a calibration gas pressure in the chamber, a calibration ion signal of an ion beam of the radiation generator, and the calibration radiation signal from the radiation generated by electrons backstreaming in the radiation generator.

18. The method of claim 17, wherein the determining comprises ascertaining the operation gas pressure from the first calibration value, the second calibration value, the operation radiation signal, the operation acceleration signal, and the operation extractor signal.

19. The method of claim 15, further comprising supplying an acceleration voltage to the acceleration member at a substantially fixed rate.

20. The method of claim 15, further comprising controlling a power supplied to the radiation generator to maintain the operation gas pressure at a selected gas pressure or below the selected gas pressure.

* * * * *